United States Patent Office 3,462,945
Patented Aug. 26, 1969

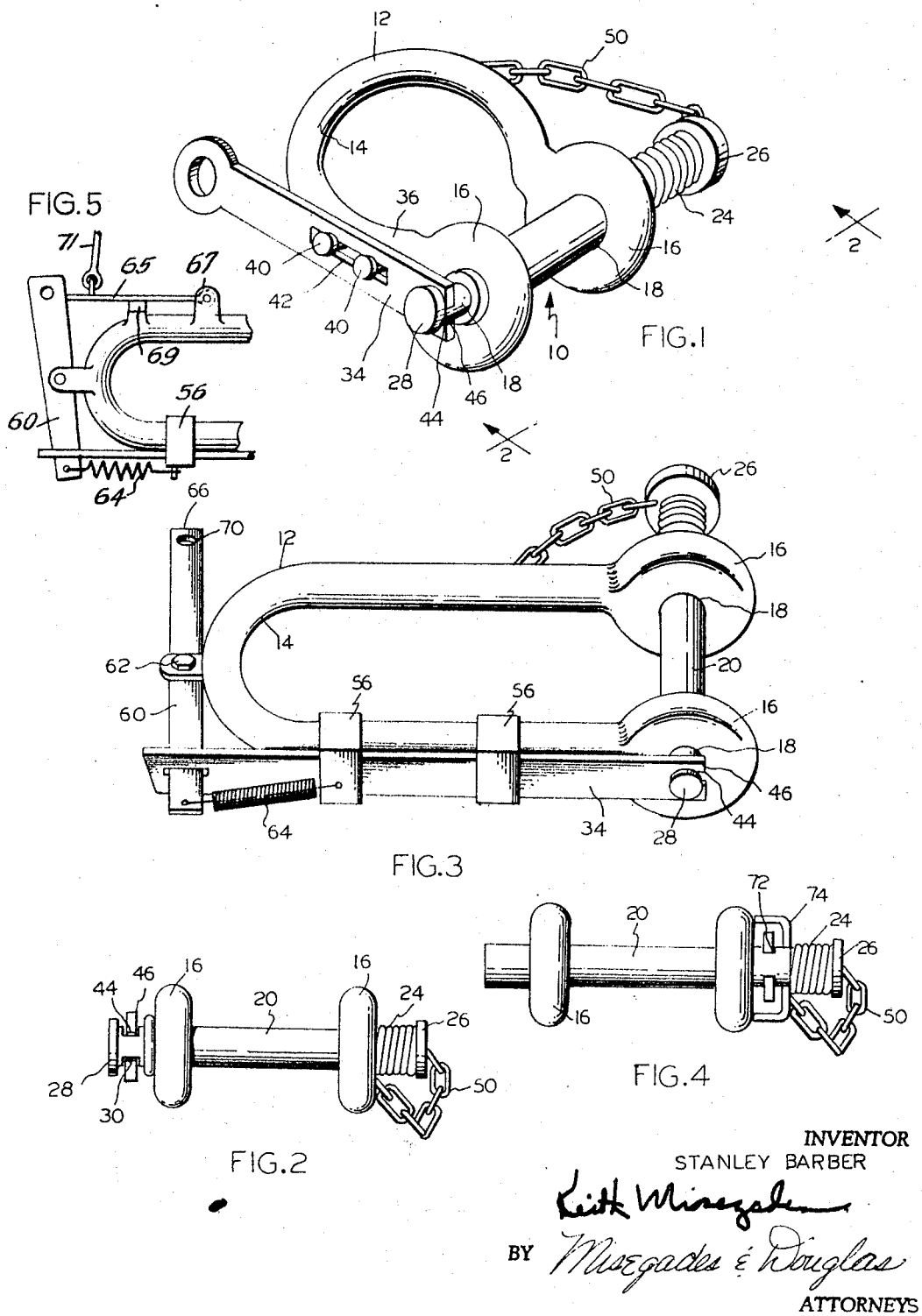

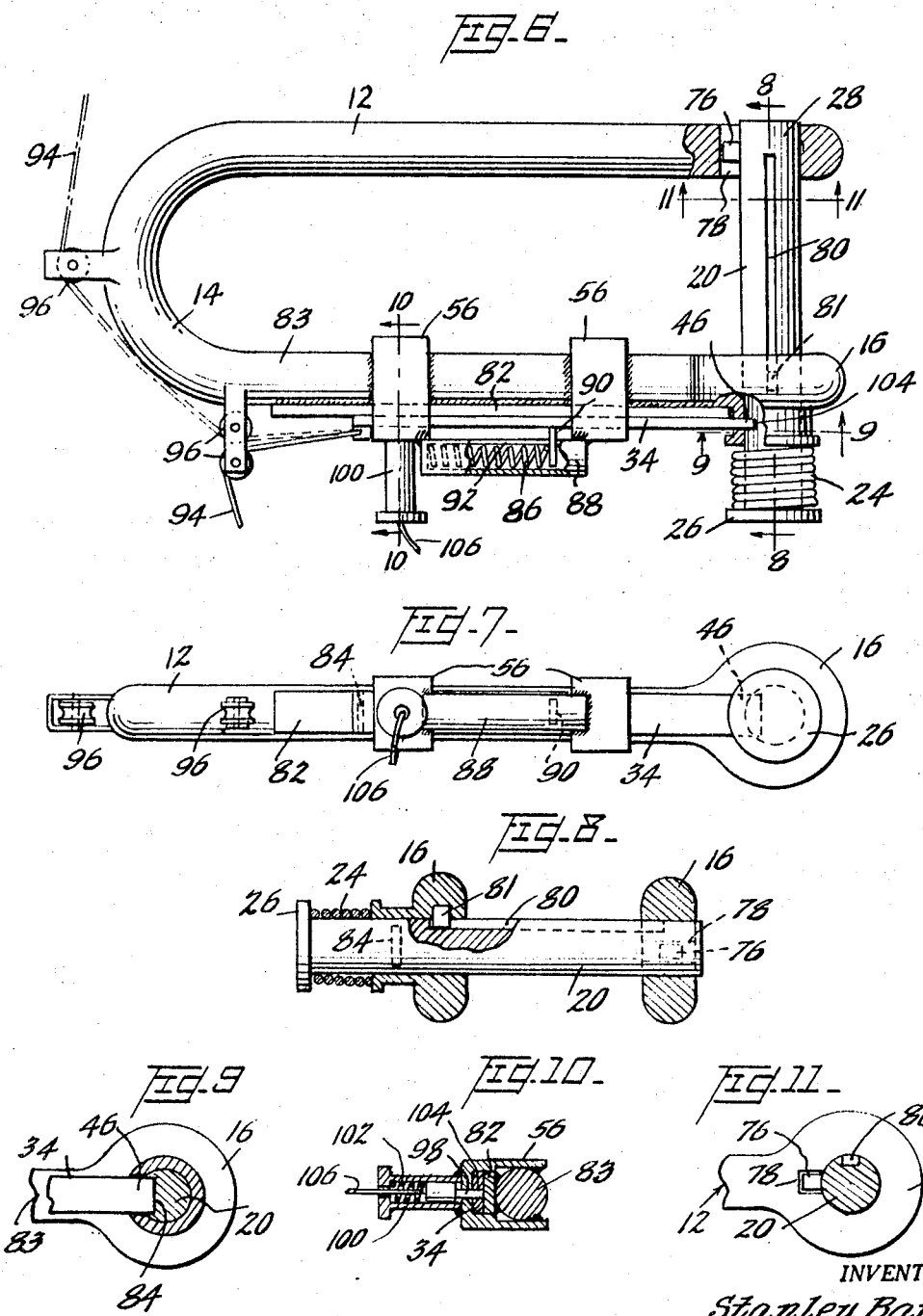

3,462,945
SPRING LOADED SHACKLE
Stanley Barber, Magazine, Ark.
(P.O. Box 123, Fort Smith, Ark. 72901)
Filed Oct. 12, 1966, Ser. No. 586,275
Int. Cl. F16g 13/06, 13/08
U.S. Cl. 59—86                                       9 Claims

ABSTRACT OF THE DISCLOSURE

A clevis is provided for release by remote control. The shackle pin has a compression spring located beneath its head to facilitate its removal. One end of the pin has means cooperating with latch means mounted on one of the arms of the clevis. A lanyard or other release mechanism is applied to the latch to obtain remote control. A key-and-slot arrangement may be used to guide the shackle pin in the keeper holes.

---

The present invention relates to an improved spring loaded shackle, and more particularly the invention comprehends certain improvements useful in spring loaded shackles that are adapted to be used with substantial ease over devices and apparatus of the present art.

The present invention consists of a generally U-shaped support member, the support member being suspended or mounted in its inverted position, and in which there is a pin extending through axially aligned apertures in the free ends of the U-shaped support member, and in which there is a spring for exerting the pin into an open position with respect to the space disposed between the apertures thereof. At the one end of said pin is a head member for limiting the movement of a coil spring, while at the other end of said pin there is disposed a groove for being engaged with a latch means for holding the pin in a closed position with respect to the U-shaped support member. It is within the purview of the invention to provide the annular groove and latch engaging member thereof at any other convenient position insofar as the latch member may be operated from a lever means or other convenient arrangement that is actuable by a line from any position below and generally remote from the position where the inverted U-shaped support member is located. Finally, the latch member itself may be spring loaded so as to be urged to an engaging position with the pin, and the latch member may be further provided with a spring loaded safety latch pin to secure the latch member in an engaging position with the pin.

An object thereof of the present invention is to provide a spring loaded shackle adapted and useful for attaching and detaching loads thereto without hand operation of a latch member, and more specifically the object of the invention is to provide a latch member that does not require screwing or other mechanical movement in securing a pin for attaching and detaching loads of iron or sheet pilings while used in general contract work including construction.

A further object of the invention is to provide ease in operation of spring loaded shackles used in the attaching and detaching of farm implements.

An additional object of the invention is to provide spring loaded shackles useful in securing construction elements to the shackle and provide ease in detachment therefrom by means of the spring loaded pin construction arrangement.

The above and other objects and advantages of the invention will become apparent upon full consideration of the following detailed description and accompanying drawings in which:

FIGURE 1 shows a perspective view of an embodiment of a spring loaded shackle having the preferred features of the invention;

FIGURE 2 shows an end view taken along lines 2—2 of FIG. 1;

FIGURE 3 shows a generally perspective view of another embodiment of the invention showing preferred features thereof;

FIGURE 4 shows a generally end view of yet another embodiment of the invention, similar to the embodiment of FIG. 3, but with parts reversed;

FIGURE 5 shows a partial plan view of a modification of the left hand portion of the embodiment of FIG. 3, drawn to reduced scale;

FIGURE 6 shows a plan view of still another embodiment of the invention;

FIGURE 7 shows a side view of the embodiment of FIG. 6;

FIGURE 8 shows a sectional view taken along lines 8—8 of FIG. 6;

FIGURE 9 shows a sectional view taken along lines 9—9 of FIG. 6;

FIGURE 10 shows a sectional view taken along lines 10—10 of FIG. 6, and

FIGURE 11 shows a sectional view taken along lines 11—11 of FIG. 6.

Referring now to the drawings, there is shown a shackle 10 having a U-shaped support member 12 in which the mid-portion of the U-shaped member is adapted to be supported by a crane hook (not shown) or other support element that may be applied at point 14 thereof. The ends of the U-shaped support member are terminated in enlarged extensions 16, 16 that are annular in shape and have apertures 18, 18 for receiving an axially aligned pin that extends through the apertures 18, 18. The pin 20 extending through the apertures 18, 18 is of sufficient length that there is a space for receiving a coil spring 24 between a head 26 of the pin and the intermediate or next adjacent annular free end 16. The length of the pin 20 is sufficient so that the distal end 28 is withdrawn from the proximate annular free end 16 by the coil spring 24.

In order to retain or secure the pin 20 in closed relation across the open end of the U-shaped support member 12 so that it extends through the apertures 18, 18, there is an annular recess 30 near the end of the pin opposite to the head 26, the annular recess 30 being provided for receiving a sliding latch mechanism 34. The sliding latch mechanism 34 is mounted along side 36 of the U-shaped support member 12, the side 36 being distal from that side of the U-shaped member which is positioned closest to the pin head 26. The latch mechanism is seen as being in sliding engagement by a bracket or pin sliding arrangement 40, 40 which limits the sliding movement of the latch mechanism by means of the ends of the slot 42. The latch mechanism is terminated in a recessed portion or recess 44 at the end of the latch mechanism, and when the pin 20 is fully extended and received within the pin receiving aperatures 18, 18 by compression of the coil spring 24, then the annular recess 30 is adapted and made to engage with the recess 44 which is disposed at the end 46 of the latch mechanism 34. Thus the recess 44 engages the annular recess 30 of the pin 20 upon the coil spring 24 being fully compressed by the pin head 26 exerting a force against the coil spring and the adjacent annular end 16. When the spring loaded shackle 12 is supported by a crane hook at point 14 thereof, and when a load is supported by the pin 20, it is seen that the load may be readily released and the release may be accurately controlled by the latch mechanism 34 being pulled in the direction of the crane hook or upwardly, and toward the left as shown in FIG. 1, so that upon complete disengagement of the latch mechanism 34 from the annular recess 30 of the pin 20, the pin 20 is caused to be removed from the annular end 16 and the aperture 18 on side 36, so that the pin is completely removed and any load as mentioned above that is supported by pin 20 intermediate the annular ends 16, 16 is caused to be disengaged and removed therefrom. This is effected by actuation of the coil spring 24 which offers a consistent bias between the pin head 26 and its adjacent annular end 16.

When a load is sought to be again supported and carried by the spring loaded shackle, the load lifting mechanism (not shown) is applied within the U-shaped support member 12, the pin 20 is closed off between the annular ends 16, 16 and the latch mechanism 34 is displaced so that its recess 44 mutually engages the recess 30 of the pin 20. The coil spring 24 is seen to provide a locking and securing bias of the latch mechanism 34 against the end 28 of the pin 20 while the recesses 30, 44 engage each other. The spring loaded shackle is then ready to carry or otherwise support the load applied to pin 20. The crane hook or other mechanism is consistently applied to point 14.

Within the contemplation of the invention, there is also means for applying a retaining chain 50 between the pin head 26 and the other side of the U-shaped support member from side 36, or the chain may be welded to any other part of the U-shaped support member, as desired.

A further modification of the invention is similarly disposed and disclosed in FIG. 3 wherein a bracket mounting means 56, 56 is provided to support the latch mechanism 34 for sliding engagement therealong. In order for a line or other cable connecting means to cause the necessary opening of the latch mechanism 34, a lever means 60 is provided to be pivotally mounted from the U-shaped support member from a side thereof opposite to point 14 by a pivot means 62, so that the latch mechanism 34 may be closed and opened by the lever means 60. A spring 64 is provided between one of the brackets 56 and the free end of the lever means 60 for retaining the latch mechanism 34 in a normally downward position when supported from point 14, as shown in FIG. 3. The distal end 66 of the lever means 60 may be provided with an opening 70 to which may be connected a cable or line for actuation of the latch mechanism from a point on the ground or below the physical position where the spring loaded shackle 10 may be located at any one time.

As a safety precaution, the embodiment shown in FIGURE 3 may be provided with a stop bar 65 swingably mounted at 67 in the plane of U-shaped support member 12. When latch mechanism 34 is engaged, bar 65 is placed in the position shown by FIG. 5, beneath lever means 60, and is held in place by suitable means such as a magnet 69. A line 71 is attached to bar 65 to disengage the bar from lever means 60. Thus, both spring 64 and bar 65 assure retention of latch mechanism 34 in the normally downward position.

In order to reverse the actuating lever 60, placing the latch element 34 on the same side of the U-shaped body as the headed end of the pin, the parts of FIG. 3 may be reversed, with the bracket mounting means 56, 56 being transferred to the opposite arm of the shackle. The recess 44 of the latch element 34 engages a recess 72 corresponding to recess 30 in FIGS. 2 and 3. As shown in FIG. 4, an abutment plate 74 for the spring 24 bridges the pin 20, being welded to the adjacent enlarged portion 16 of the shackle body. This arrangement may be preferred at some times; obviously, its operation is the same as the device shown in FIG. 3.

Yet another modification of the invention is illustrated in FIGS. 6 through 10. The invention is arranged generally in the manner of the embodiment shown in FIG. 4, in that latch element 34 is placed on the same side of the U-shaped body as the headed end of the pin. The need for chain 50 is eliminated by providing a retaining stop member 76 on distal end 28. A slot 78 is formed in extension 16 for receiving stop 76 when pin 20 is in a closed position. In order to assure alignment of stop 76 and slot 78, pin 20 is provided with a keyway 80 formed along the length thereof, and a mating key 81 is formed internally of the aperture 18 adjacent head 26 of pin 20. Keyway 80 and key 81 prevent rotation of pin 20 with respect to apertures 18, 18 thus assuring alignment of stop 76 with slot 78.

A backing plate 82 is provided interiorly of bracket means 56, 56, against stem 83 of U-shaped support 12 to facilitate easier sliding of latch mechanism 34. Since pin 20 cannot rotate, end 46 of latch mechanism 34 need not be provided with a recess, and recess 72 may be replaced by a single slot 84 for receiving end 46.

Spring 64 is replaced by a compression spring 86 which is arranged in a tube 88 mounted between bracket means 56, 56 exteriorly of latch mechanism 34. One end of spring 86 is seated on plate 90, welded on latch 34. A longitudinal slot 92 is formed on the interior side of tube 88 to allow plate 90 to slide therein. In this manner, latch 34 is constantly urged downwardly against pin 20. Latch 34 may be lifted against the urging of spring 86 by a line or cable 94 which may be trained on either side of support 12 by rollers 96 mounted exteriorly thereof.

Finally, latch mechanism 34 may be provided with another safety feature which operates in the same manner as stop bar 65 does with respect to the embodiment shown in FIG. 3. In this case, a latch pin 98 is mounted with a tubular housing 100, formed on the bracket 56 distal from extension 16 (FIG. 10). A compression spring 102 urges pin 98 into opening 104 formed in latch 34, and may be disengaged therefrom by means of a line 106 attached to the free end of pin 98.

It is seen that by the application of the features of the invention, an improved spring loaded shackle is provided so that the load may be readily disengaged from being supported by pin 20 at any time, as desired.

Additional embodiments of the invention in this specification will occur to others and therefore it is intended that the scope of the invention be limited only by the appended claims and not by the embodiments described above. Accordingly, reference should be made to the following claims in determining the full scope of the invention.

What is claimed is:

1. A spring loaded shackle comprising a U-shaped body member having an axially aligned pin-receiving aperture in each of the free ends thereof, a pin received in said apertures, said pin having a head at one end thereof, a spring on said pin interposed between said head and the adjacent pin receiving aperture, a latch mechanism mounted on one of the outer sides of said U-shaped body member for providing sliding engagement with said pin, a recess in said pin, said latch mechanism having an end for engaging said recess of said pin when the pin head is depressed against said spring to close off the U-shaped body member and while the pin is in communication with both of said pin receiving apertures, the recess in said pin coinciding with said latch member when the pin is in closed position spring means normally urging the latch member to closed position and means operable from a remote location for opening the latch.

2. The invention according to claim 1 wherein means are provided on said U-shaped body, to limit the movement of said pin with respect to said U-shaped body.

3. The invention according to claim 2 wherein said means to limit the movement of said pin with respect to said U-shaped body comprises a stop member formed adjacent the free end of said pin arranged to maintain said pin within said adjacent pin receiving aperture.

4. The invention according to claim 2 wherein said means to limit the movement of said pin with respect to said U-shaped body comprises a stop member formed adjacent the free end of said pin arranged to maintain said pin within said adjacent pin receiving aperture, the other of said apertures having means defining a slot therein for receiving said stop when said pin is in a closed position.

5. The invention according to claim 1 wherein said U-shaped body member includes bracket means mounted on a stem thereof for supporting said latch mechanism, said spring means comprising a tubular housing, mounted on said bracket means exteriorally of said latch mechanism, a compression spring housed therein, and a spring plate mounted on said latch mechanism, and extending into said tubular housing, said spring seated thereon.

6. The invention according to claim 5 wherein said bracket means adjacent the closed end of the U-shaped support member includes a second tubular housing thereon, a spring biased latch pin thereon, said latch mechanism having an opening thereon for receiving said latch pin, said latch pin engaged in said latch opening when the apparatus is in said closed position, and means for disengaging said latch pin from said opening.

7. The invention according to claim 1 wherein a lever means is mounted from the closed end of the U-shaped support member for actuation of the latch mechanism, a spring is applied to the lever mechanism for retaining and biasing it to a closed condition, and the other end of the lever mechanism is provided with means for remote actuation.

8. The invention according to claim 7 wherein a swingable stop member is mounted beneath said other end of the lever mechanism, said stop member having means retaining the stop beneath said other end of the lever mechanism when the latch mechanism is in a closed position, and line means for disengaging said stop member to free said latch mechanism.

9. The invention according to claim 1 wherein the latch mechanism is located on the side of the U-shaped body carrying the headed end of the pin.

References Cited

UNITED STATES PATENTS

| 1,751,309 | 3/1930 | De Mone | 59—86 |
| 418,031 | 12/1889 | Kull | 59—85 |
| 520,110 | 5/1894 | Hull | 59—86 |
| 575,032 | 1/1897 | Kimbrell | 59—86 |
| 1,121,865 | 12/1914 | Pitt | 59—86 |
| 1,419,974 | 6/1922 | McLaughlin | 59—86 |

CHARLES W. LANHAM, Primary Examiner

B. J. MUSTAIKIS, Assistant Examiner